April 8, 1969    H. BROUWER    3,437,842
FAIL SAFE BRIDGE OUTPUT SWITCH
Filed Oct. 20, 1965

INVENTOR.
HARVARD BROUWER

United States Patent Office 3,437,842
Patented Apr. 8, 1969

3,437,842
FAIL SAFE BRIDGE OUTPUT SWITCH
Harvard Brouwer, Grand Rapids, Mich., assignor to Lear Siegler, Inc.
Filed Oct. 20, 1965, Ser. No. 498,276
Int. Cl. H03k *17/60*
U.S. Cl. 307—254                          16 Claims

ABSTRACT OF THE DISCLOSURE

This invention provides an electronic bridge circuit for providing D.C. currents of either polarity to a specified load in response to a command input. The invention basically comprises a four branch bridge circuit which includes a switching element in each of the branches.

---

This invention relates to electronic bridge circuits and more particularly to electronic bridge circuits which are capable of providing currents of either polarity through an isolated load in response to a command input.

A number of electronic arrangements for providing currents of either polarity to an isolated load are well known in the art. These circuits suffer from one or more of a number of disadvantages such as the requirement of complex drive circuits, the requirement of a dual supply source, the inability to provide load currents of relatively large magnitudes, and, excessive current consumption because of improper synchronization of the branches of the bridge leg.

It is an object of this invention to provide a bridge circuit which is capable of operating from a single source two-terminal supply.

It is an object of this invention to provide a bridge circuit in which no more than two input terminals are required to initate the desired circuit function.

It is an object of this invention to provide a bridge circuit incorporatng a fail safe feature prohibiting both branches in either leg from conducting simultaneously.

It is an object of this invention to provide a bridge circuit in which voltage transients associated with a reactive load are inherently suppressed.

It is an object of this invention to provide a bridge circuit which is compatible with a logic drive function wherein a simultaneous increase or decrease of input voltage will not produce an output and where the differential input value will determine the polarity of the output current.

It is a further object of this invention to provide a bridge circuit which may readily be modified to function as a demodulator.

Finally, it is an object of this invention to provide a bridge circuit in which the current in the load will be held constant over a wide range of variations in the input and supply voltages.

These and other objects of this invention will be readily understood by reference to the following specification and accompanying figures in which.

Briefly, the basic circuitry of this invention comprises a four branch bridge circuit having a switching element in each of the branches. Across opposing terminals of the bridge are connected a D.C. source and a two-terminal load. The D.C. source provides both power to the load and operating potentials for the various switching devices in the bridge. The load can be resistive or partially reactive in nature. Current isolation is achieved by providing a pair of uni-directional conducting devices in the branches adjacent the grounded terminal. The D.C. input is coupled via a resistor network to the activating terminals of the switching elements in the branches adjacent the power input terminal. The activating terminals of these switching elements are tied to the input terminals of the switching devices in the other two branches of the bridge circuit. Input means are provided for selectively activating these later switching devices.

Figure 1:
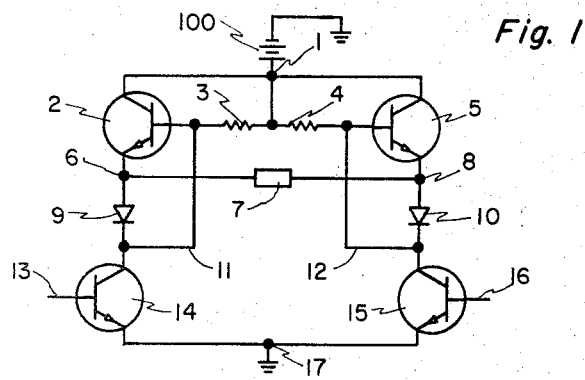
FIG. 1 is a schematic diagram of one embodiment of the bridge circuit which is the subject of this invention.

Referring now to FIG. 1 the basic circuit of this invention will be described in detail. A suitable D.C. power source is connected across the opposite terminals 1 and 17 of the bridge circuit. The load, which may be resistive or partially reactive, is connected across opposite terminals 6 and 8 of the bridge circuit. Components 2, 5, 14 and 15 are NPN transistors. Components 3 and 4 are resistors and components 9 and 10 are NP diodes. The emitter-collector terminals of transistors 2, 5, 14 and 15 are each series connected between a pair of the bridge terminals as indicated in the schematic of FIG. 1. Diodes 9 and 10 are series circuited in the branches containing transistors 14 and 15. The bases of transistors 2 and 5 are connected to source 100 via resistors 3 and 4. Conductors 11 and 12 function to maintain the bases of transistors 2 and 5 at the same potential as the collectors of transistors 14 and 15 respectively.

The circuit shown in FIG. 1 provides current through load 7 in one direction whenever a positive voltage with respect to point 17 is applied to input 13 which is the base of transistor 14 and in the opposite direction whenever a positive voltage with respect to point 17 is applied to input 16 which is the base of transistor 15. Whenever both inputs 13 and 16 are either positive with respect to point 17 or at the same potential at point 17 essentially no current flows through load 7.

Assume, for example, that a positive voltage is applied at input 13 and that input 16 is at the same potential as terminal 17. The positive voltage at input 13 will render transistor 14 conductive, thus initiating a current flow from terminal 1, through resistor 3, through transistor 14 to terminal 17. A current additionally will flow from point 1, through transistor 5, through load 7, to diode 9, and through transistor 14 to terminal 17. Transistor 5 conducts during this period because of the relatively high impedance existing across non-conducting transistor 15. Hence transistor 5 is permitted to conduct by means of base current flow from terminal 1 through resistor 4. Because diode 9 is conducting the voltage on conductor 11 is negative with respect to terminal 6. This reverse biases transistor 2 to prevent it from conducting and thus provides a fail safe bridge circuit. The circuit is fail safe in the sense that under no input conditions can both transistors 2 and 14, or transistors 5 and 15 conduct. Whenever input 16 is rendered positive with respect to terminal 17, and input 13 is at the same potential as terminal 17, the current polarity in load 7 will be reversed from the above conditions. Transistors 15 and 2 will be conducting while transistors 14 and 5 are turned off. Thus, when a positive input is applied at input 13 while input 16 is retained at ground potential the current from source 100 flows through the load in a first direction. When the potentials of inputs 13 and 16 are reversed the current flows through load 7 in the opposite direction. If inputs 13 and 16 are both at a potential identical to that existing at terminal 17 neither transistor 14 or 15 is conducting and, therefore, no current flows in either branch. When inputs 13 and 16 are both positive with respect to terminal 17 transistors 14 and 15 conduct through resistors 3 and 4 respectively. However, no current flows in load 7 because transistors 2 and 5 remain in the non-conducting state. Transistors 2 and 5 are non-conducting under these conditions because they conduct only when diodes 9 and 10 are respectively non-conducting. Diodes 9 and 10 must conduct in order to supply current in load 7. Obviously, these conditions cannot exist simultaneously and, thus, no current will flow through load 7 when positive voltages are applied to points 13 and 16 simultaneously.

The circuit of FIG. 1 inherently prevents the currents in transistor 14 from flowing through transistor 2 and likewise prevents the currents in transistor 15 from flowing through transistor 5, thus insuring against a short circuit of the power supply. Additionally, this circuit provides inherent protection against transient voltage spikes resulting from inductive loads such as D.C. torquers. These transients cause excessive breakdown voltages which would ultimately destroy transistors 14 and 15 were they not suppressed. Assume, for example, a transient voltage across load 7 which is positive at terminal 6 with respect to terminal 8. As the voltage at terminal 6 increases a current will flow through diode 9 and through the forward biased base to collector junction of transistor 2 to terminal 1 of the supply, thus maintaining terminal 6 within a few volts of terminal 1. As terminal 8 becomes negative with respect to terminal 6, transistor 5 conducts in a similar manner. Thus the circuit inherently suppresses excessive breakdown voltages and the resulting damage to switching elements 14 and 15.

Figure 2:
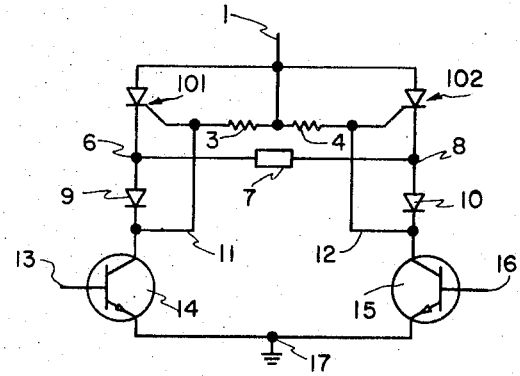
FIG. 2 is a schematic diagram of a second embodiment of the bridge circuit which is the subject of this invention.

FIG. 2 shows a circuit which is similar to that described in FIG. 1 except that the switching elements 2 and 5 in FIG. 1 have been replaced by silicon controlled rectifiers 101 and 102 respectively. The utilization of controlled rectifiers instead of transistors in the upper branches of the bridge offers two distinct advantages. First, controlled rectifiers as a rule have a lower input-output impedance than transistor switching devices. Thus the power loss in elements 101 and 102 of FIG. 2 is less than that in the corresponding elements 2 and 5 of FIG. 1. Second, the triggering characteristics of the controlled rectifier markedly reduce the current required through resistors 3 and 4 in order to maintain conduction. On the other hand, the arrangement of FIG. 2 has some disadvantages over that shown in FIG. 1. Initially, it will be noted that the circuit shown in FIG. 2 does not provide the inherent transient suppression present in the circuit of FIG. 1. Further, the holding current and gate turn-off current required when utilizing controlled rectifiers must be taken into account when deciding which type of circuit is best suited for a particular installation.

Figure 3:
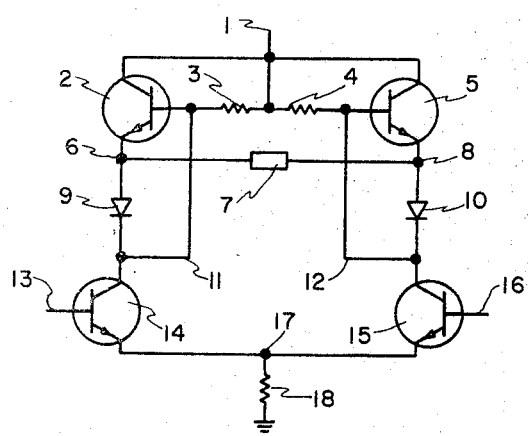
FIG. 3 is a schematic diagram of a modified embodiment of the bridge circuit shown in FIG. 1.

The embodiment shown in FIG. 3 is similar to that shown in FIG. 1 with the exception that a resistor 18 has been added between terminal 17 and the ground connection. The addition of resistor 18 permits control of the magnitude, as well as the polarity, of the current flowing in load 7. In this embodiment the potential at terminal 17, and thus the potentials on the emitters of transistors 14 and 15, is a function of the magnitude of the current flowing through resistor 18. Even though positive voltages are applied to both input terminals 13 and 16 the direction of the current through the load 7 will be governed by whichever input voltage is more positive.

Figure 4:
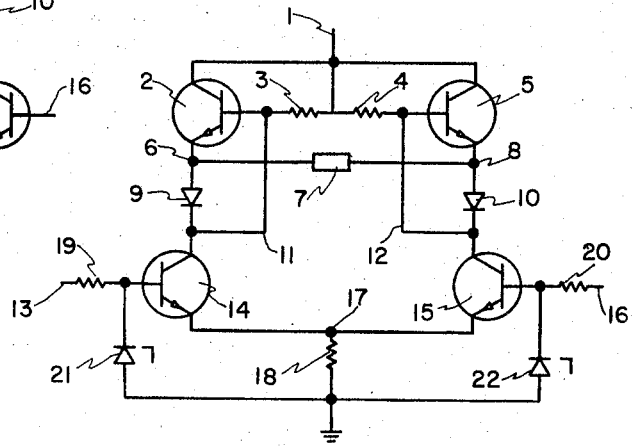
FIG. 4 is a schematic diagram of an embodiment similar to that shown in FIG. 3 except for the inclusion of components to limit the drive voltage of the transistors.

The circuit shown in FIG. 4 incorporates, in addition to the resistor 18 shown in FIG. 3, a pair of separate resistors 19 and 20 and a pair of Zener diodes 21 and 22. As may be seen from the figure resistors 19 and 20 are in series with control inputs 13 and 16 to transistors 14 and 15. The Zener diodes connect the bases of the transistors 14 and 15 to ground. The circuit shown in FIG. 4 is particularly adapted for use under operating conditions requiring a constant load current under varying input conditions. Resistor 18 in the emitter circuits of transistors 14 and 15 permits the circuit to function even though a positive input appears at both control inputs 13 and 16. As in FIG. 3, the polarity of the current in the load is governed by the more positive input signal at control inputs 13 and 16. Zener diodes 21 and 22 maintain the voltage at the bases of transistors 14 and 15 at a prescribed maximum level and thus stabilize the magnitude of current through load 7.

Figure 5:
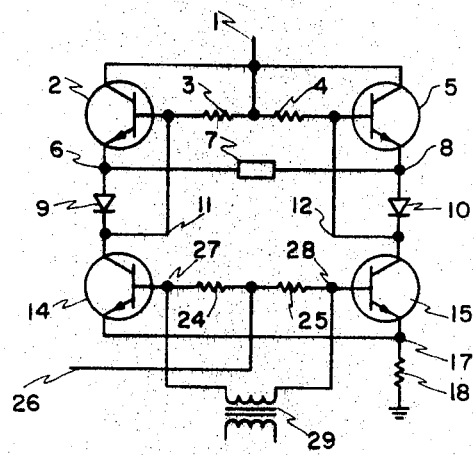
FIG. 5 is a schematic diagram showing a modification of the embodiment of FIG. 3 wherein components have been added to enable the device to perform as a demodulator.

In FIG. 5 the circuit shown in FIG. 3 has been modified in order that it may function as a demodulator. Resistors 24 and 25 are connected in series between the bases of transistors 14 and 15 as shown. An isolated voltage is applied to terminals 27 and 28 by means of transformer 29. The polarity of the voltage across terminals 27 and 28 determines the polarity of the current through load 7. The transformer input must coincide with a positive voltage at terminal 26. The magnitude of the current flowing through load 7 is determined by the voltage applied at terminal 26.

Figure 6:
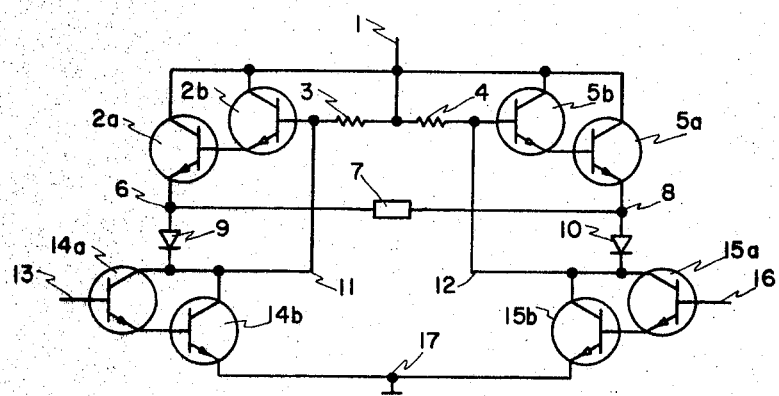
FIG. 6 is a schematic diagram of a circuit similar to that shown in FIG. 1 except for the provision of a darlington arrangement of transistors; and, FIG. 7 is a schematic diagram of another embodiment of this invention which is similar to that shown in FIG. 1 except for the utilization of a higher voltage bias on the transistor bases.

The circuit shown in FIG. 6 is equivalent to that shown in FIG. 1 except that each of transistor switching devices 2, 5, 14 and 15 have been replaced by a darlington arrangement of transistor switching devices 2a–2b, 5a–5b, 14a–14b and 15a–15b. As is well known in the art such switching arrangements improve circuit efficiency under increased load demands. The other features and operating characteristics of the circuit of FIG. 6 are identical to those described with regard to FIG. 1.

Figure 7:
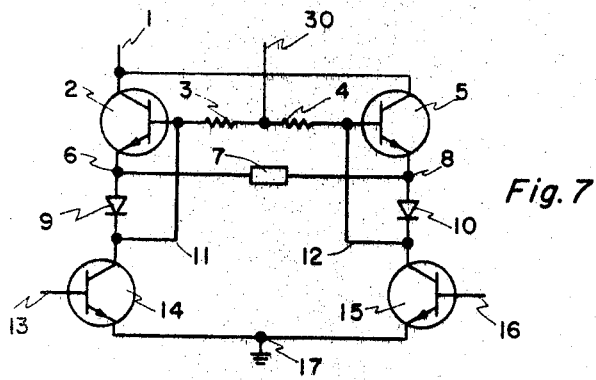

The circuit shown in FIG. 7 is again similar to that shown in FIG. 1 except that resistors 3 and 4 are connected to terminal 30 instead of terminal 1. Conveniently, terminal 30 may be at a higher potential than terminal 1. Such an arrangement permits transistors 2 and 5 to operate in a completely saturated condition. It also enables an increase in the values of resistors 3 and 4 with an attendant increase in efficiency.

While each of the embodiments of this invention has been described as utilizing NPN transistors it will be obvious to those skilled in the art that PNP type transistors could be utilized by simply reversing the polarities of the supply and signal voltages and the polarity sensitive components.

Thus it will be seen that this invention has provided a bridge circuit capable of providing currents of either polarity to a specified load depending upon the command to the circuit. These commands may be generated, for example, from a condition responsive computer and the load may take the form, for example, of a D.C. torquer which desirable positions its rotor as a function of those conditions. Depending upon the particular type of input signal being supplied to the bridge circuit and the particular type of load being controlled, the appropriate circuit may be chosen.

While several preferred embodiments of this invention have been described together with minor modifications, it will be recognized that other modifications may be made without departing from the scope and spirit of the invention. Such modifications are to be deemed as included within the scope of the following claims unless these claims, by their language, expressly state otherwise.

I claim:

1. Apparatus for providing currents of a desired polarity in a load comprising:

a source of direct current;

a bridge circuit having first, second, third and fourth branches, said first branch having the input and output terminals of a first switching device connected in series therein, said second branch having the input and output terminals of a second switching device connected in series with a first unidirectional conducting device therein, said third branch having the input and output terminals of a third switching device connected in series with a second unidirectional conducting device therein, said fourth branch having the input and output terminals of a fourth switching device connected in series therein, said source being connected across the junctions of said first and fourth branches and said second and third branches respectively, all of said switching devices having activating terminals in addition to said input and output terminals;

means for applying a voltage to said activating terminals of said first and fourth switching devices;

means connecting the junction of said first unidirectional conducting device and said second switching device to the activating terminal of said first swtiching device;

means connecting the junction of said second unidirectional conducting device and said third switching device to the activating terminal of said fourth switching device; and a pair of load terminals located at the junctions between said first and second branches and between said third and fourth branches.

2. The combination as set forth in claim 1 wherein said first unidirectional conducting device is connected between said second switching device and the junction of said first and second branches and, said second unidirectional conducting device is connected between said third switching device and the junction of said third and fourth branches.

3. The combination as set forth in claim 2 wherein said means for applying a voltage comprises:

a first pair of impedances connected in series between the activating terminals of said first and fourth switching devices; and a voltage source connected to the junction of said first pair of impedances.

4. The combination as set forth in claim 3 wherein said first, second, third and fourth switching devices are transistors.

5. The combination as set forth in claim 3 wherein said first and fourth switching devices are controlled rectifiers and said third and fourth switching devices are transistors.

6. The combination as set forth in claim 3 which further comprises a resistor connected between the junction of said second and third branches and the grounded side of said power supply whereby the magnitude and polarity of the current available across the load terminals will be a function of the input voltages at the activating terminals of said second and third switching devices.

7. The combination as set forth in claim 3 in which each of said switching devices is a darlington transistor arrangement.

8. The combination as set forth in claim 3 in which said means for applying a voltage to the activating terminals of said first and fourth switching devices is a connection between the junction of said first and fourth legs and the junction of said first pair of impedance means.

9. The combination as set forth in claim 6 which further comprises a pair of breakdown diodes connected between the activating terminals of said second and third switching devices and the grounded side of said power supply whereby the current available at the load terminals will be held constant over a range of control input voltages applied to the activating inputs of said second and third switching devices.

10. The combination as set forth in claim 6 which further comprises:

a second pair of impedances connected in series between the activating terminals of said second and third switching devices;

transformer means for applying an isolated voltage across said second pair of impedances; and means for applying a voltage to the junction of said second pair of impedances.

11. Apparatus for providing currents of a desired polarity in a load comprising:

a source of direct current;

a bridge circuit having first, second, third and fourth branches, said first branch having the anode and cathode of a first controlled rectifier connected in series therein, said second branch having the emitter and collector of a first transistor in series with a first unidirectional conducting device therein, said first unidirectional conducting device being positioned between said first transistor and the junction of said first and second branches, said third branch having the emitter and collector of a second transistor connected in series with a second unidirectional conducting device therein, said second unidirectional conducting device being positioned between said second transistor and the junction of said third and fourth branches, said fourth branch having the anode and cathode of a second controlled rectifier connected in series therein, said source being connected across the junctions of said first and fourth branches and said second and third branches respectively;

a pair of impedances in series connection between the gates of said first and second controlled rectifiers;

means for applying a voltage to the junction of said pair of impedances;

means connecting the gates of said first and second controlled rectifiers to the junctions of said first unidirectional conducting device and said first transistor and of said second unidirectional conducting device and said second transistor respectively; and, a pair of load terminals located at the junctions of said first and second branches and of said third and fourth branches.

12. Apparatus for providing currents of a desired polarity in a load comprising:

a source of direct current;

a bridge circuit having first, second, third and fourth branches, said first branch having the emitter and collector of a first transistor connected in series therein, said second branch having the emitter and collector of a second transistor connected in series with a first diode therein, said first diode being positioned between said second transistor and the junction of said first and second branches, said third branch having the emitter and collector of a third transistor connected in series with a second diode therein, said second diode being positioned between said third transistor and the junction of said third and fourth branches, said fourth branch having the emitter and collector of a fourth transistor connected in series therein, said source being connected across the junctions of said first and fourth branches and said second and third branches respectively;

a first pair of impedances in series connection between the bases of said first and fourth transistors, the junction of said first pair of impedances being connected to a voltage source;

means connecting the bases of said first and fourth transistors to the junctions of said first diode and said second transistor and of said second diode and said third transistor respectively; and, a pair of load terminals located at the junctions of said first and second branches and of said third and fourth branches.

13. The combination as set forth in claim 12 which further comprises a resistor connected between the junction of said second and third branches and the grounded side of said power supply whereby the magnitude and polarity of the current available across the load terminals will be a function of the input voltages at the bases of said second and third transistors.

14. The combination as set forth in claim 13 which further comprises a pair of Zener diodes connected between the bases of said second and third transistors and the grounded side of said power supply whereby the current available at said load terminals will be held constant over a range of control input voltages applied to the bases of said second and third transistors.

15. The combination as set forth in claim 13 which further comprises:
   a second pair of impedances connected in series between the bases of said second and third transistors;
   transformer means for applying an isolated voltage across said second pair of impedances; and,
   means for applying a voltage to the junction of said second pair of impedances.

16. The combination as set forth in claim 12 which further comprises a load connected across said load terminals.

References Cited

UNITED STATES PATENTS

| | | | |
|---|---|---|---|
| 2,821,639 | 1/1958 | Bright et al. | 307—254 |
| 2,838,675 | 6/1958 | Wanlass | 307—291 |
| 3,018,445 | 1/1962 | Stone | 307—254 |
| 3,182,210 | 5/1965 | Jebens | 307—254 |
| 3,227,889 | 1/1966 | Paynter | 307—254 |
| 3,237,030 | 2/1966 | Coburn | 307—254 |

ARTHUR GAUSS, *Primary Examiner.*

H. A. DIXON, *Assistant Examiner.*